(12) United States Patent
Gregg

(10) Patent No.: US 11,606,905 B2
(45) Date of Patent: Mar. 21, 2023

(54) CROP CANOPY GLEANING MACHINE

(71) Applicant: Michelle D. Gregg, Bellville, OH (US)

(72) Inventor: Michelle D. Gregg, Bellville, OH (US)

( * ) Notice: Subject to any disclaimer, the term of this patent is extended or adjusted under 35 U.S.C. 154(b) by 351 days.

(21) Appl. No.: 16/884,503

(22) Filed: May 27, 2020

(65) Prior Publication Data
US 2020/0288630 A1 Sep. 17, 2020

Related U.S. Application Data

(63) Continuation-in-part of application No. PCT/US2018/062509, filed on Nov. 27, 2018.

(60) Provisional application No. 62/590,770, filed on Nov. 27, 2017.

(51) Int. Cl.
| | | |
|---|---|---|
| *A01D 34/835* | (2006.01) | |
| *A01D 47/00* | (2006.01) | |
| *A01B 39/18* | (2006.01) | |
| *A01D 34/43* | (2006.01) | |
| *A01D 34/54* | (2006.01) | |
| *A01D 34/56* | (2006.01) | |
| *A01D 69/03* | (2006.01) | |
| *A01D 101/00* | (2006.01) | |

(52) U.S. Cl.
CPC ............ *A01D 47/00* (2013.01); *A01D 34/43* (2013.01); *A01D 34/54* (2013.01); *A01D 34/56* (2013.01); *A01D 34/835* (2013.01); *A01D 69/03* (2013.01); *A01B 39/18* (2013.01); *A01D 2101/00* (2013.01)

(58) Field of Classification Search
CPC .... A01B 39/18; A01D 34/015; A01D 34/835; A01D 2101/00; A01D 45/30; A01D 47/00
See application file for complete search history.

(56) References Cited

U.S. PATENT DOCUMENTS

| 2,706,882 | A | | 4/1955 | Thornton, Jr. et al. | |
|---|---|---|---|---|---|
| 3,115,741 | A | * | 12/1963 | Robinson | A01B 39/18 56/192 |
| 4,040,238 | A | * | 8/1977 | Hill | A01D 47/00 56/126 |
| 4,253,296 | A | * | 3/1981 | Boydston | A01D 47/00 56/238 |
| 4,648,463 | A | * | 3/1987 | Toshiichi | A01B 39/18 171/61 |

(Continued)

FOREIGN PATENT DOCUMENTS

| AT | 509337 B1 | * | 8/2011 | ............ A01D 47/00 |
|---|---|---|---|---|
| GB | 2106766 A | | 4/1983 | ............ A01D 47/00 |

(Continued)

*Primary Examiner* — Adam J Behrens
(74) *Attorney, Agent, or Firm* — Standley Law Group LLP; Jeffrey S. Standley; Bryan P. Finneran

(57) ABSTRACT

Some crops, such as soybeans, grow close to the ground, having a low canopy relative to that of weeds growing interspersed in the crop. A farm implement removes weed growth above the crop canopy. The implement has a chassis with at least three wheels connected to the chassis, a cutting mechanism, mounted at a front end of the chassis, a means for collecting weed growth cut by the cutting mechanism, mounted on the chassis, means for generating and selectively applying rotational torque to at least one of the at least three wheels and means for a user to guide the chassis down the rows in which the crop is grown.

18 Claims, 4 Drawing Sheets

(56) References Cited

U.S. PATENT DOCUMENTS

| | | | |
|---|---|---|---|
| 5,255,500 A | 10/1993 | von Allwoerden | |
| 6,381,934 B2* | 5/2002 | Heard | A01D 34/76 |
| | | | 56/13.6 |
| 6,452,655 B1 | 9/2002 | Ferraris | |
| 7,726,108 B1 | 6/2010 | Pruitt et al. | |
| 9,756,845 B1* | 9/2017 | Bourquin | A01M 21/02 |
| 10,136,579 B2* | 11/2018 | Button | A01D 43/08 |
| 11,039,562 B2* | 6/2021 | Bourgault | A01D 34/74 |
| 11,206,762 B2* | 12/2021 | Button | A01D 34/835 |
| 2002/0000081 A1* | 1/2002 | Heard | A01D 47/00 |
| | | | 56/6 |
| 2002/0011057 A1 | 1/2002 | Dillon | |
| 2004/0231308 A1* | 11/2004 | Murphy | A01D 47/00 |
| | | | 56/14.9 |
| 2014/0083073 A1* | 3/2014 | Doerscher, Sr. | A01D 45/021 |
| | | | 56/56 |
| 2017/0013777 A1 | 1/2017 | Posselius et al. | |
| 2018/0007834 A1* | 1/2018 | Martin | A01D 34/71 |
| 2019/0059196 A1* | 2/2019 | Bourgault | A01B 39/18 |
| 2019/0075722 A1* | 3/2019 | Miller | A01B 59/048 |
| 2019/0082591 A1* | 3/2019 | Bassett | A01D 34/835 |
| 2019/0343042 A1* | 11/2019 | Button | A01D 34/64 |

FOREIGN PATENT DOCUMENTS

| | | | | |
|---|---|---|---|---|
| KR | 2006037856 A * | 5/2006 | | A01B 39/18 |
| WO | WO-9808373 A1 * | 3/1998 | | A01D 47/00 |

* cited by examiner

CROP CANOPY GLEANING MACHINE

CROSS-REFERENCE TO RELATED APPLICATIONS

This application is a bypass continuation-in-part of PCT/US2018/062509 of 27 Nov. 2018, which is in turn a non-provisional of U.S. provisional application 62/590,770, filed on 27 Nov. 2017. Both prior applications are incorporated by reference as if fully recited herein.

TECHNICAL FIELD

The embodiments disclosed herein relate to a implement of farm machinery for cutting weeds during a crop growing season, where the cutting is restricted to an area above a canopy of the crop, especially when the crop grows close to the ground.

BACKGROUND ART

Organic farmers are consistently at a disadvantage when it comes to battling invasive weeds. These weeds compete with the intended crop for nutrients and root space in the soil. Additionally, these weeds can grow taller than the crop, preventing access to sunlight. Noxious weeds are the primary cause of lost crop yields and lower quality grade at market. This leads to reduced income due to cost of labor to remove weeds, lesser amount of crop to sell, and lower quality crops due to the presence of weed seeds.

Synthetic herbicides are effective but not an option for organic farmers. Conventional methods can sufficiently keep weeds at bay in between rows of crops, but when weeds begin to grow within the rows themselves, conventional methods are ineffective. Organic farmers have attempted to hire crews to manually remove weeds from crops, but this can be pricey at a cost of more than $200/acre needed 3-5 times throughout the growing season. Additionally, these manual crews do not provide an adequate way to prevent the weeds from seeding and growing again the next year. Crews can be hired to trim the weeds above the canopy of the intended crops, but this also costs significant money and allows the seed pods above the canopy to fall to the ground and sow for next year.

There exists a need for something that can effectively control weeds for the current growing season without allowing the continued seeding for future seasons.

SUMMARY

This and other unmet needs of the prior art are met by an implement of farm machinery for trimming and collecting weeds. The farm equipment is a vehicle and may have as few as three wheels. At least two wheels will be located at either the front or rear of the vehicle, and at least one wheel may be located at the opposite end. The wheels may be laterally spaced apart such that when the farm vehicle is moving over rows of crops, the wheels are rolling over the terrain between crop rows and not on the crops themselves. Exemplary embodiments utilize narrow wheels to allow for precise maneuvering between rows, and should any wheel roll over crops, damage is minimized by the less surface area rolling over the crops. Exemplary embodiments will keep the size of a vehicle to a minimum to further increase ease of maneuverability among crops. However, other embodiments may be wider to cut more rows of crops at the same time.

Exemplary embodiments will contain a steering mechanism in connection with the wheels to maneuver the vehicle between rows and over crops. This steering mechanism may employ front-wheel drive, rear-wheel drive, or all-wheel drive. This steering mechanism may also be in connection with a steering wheel or other comparable device to allow the user to easily change the direction of the vehicle while in motion. This steering device may operate under manual power or through the assisted use of power steering. The steering mechanism may employ the use of hydraulic pumps. These hydraulic pumps may independently feed to each wheel or may only be connected to certain wheels, front or back. The pumps may also operate independently to control a single wheel or operate in multitude to control at least two wheels. Exemplary embodiments may utilize a hydrostatic assembly for steering.

The vehicle may have a seat affixed to the chassis. This seat may be positioned so that the person operating the vehicle is facing the same direction the vehicle is moving. This seat may also be positioned so that the person operating the vehicle can see over the tallest setting of the cutting mechanism. From this seat, the person operating the vehicle will have all operational controls within reach. These operational controls may include but not be limited to or limited by the following: gas and brake pedals or levers, raising and lowering of cutting device, raising and lowering of the chassis of the vehicle, steering wheel or mechanism, and engine on/off device.

Exemplary embodiments of the invention will allow for removable, interchangeable cutting mechanisms. Possible cutting mechanisms may perform a variety of functions for both organic and non-organic farmers including, but not limited to or limited by the following: mowing weeds, removal of plant reproductive parts, pollen collection, and seed collection. These interchangeable cutting mechanisms may be manually installed, requiring the user to install the specific device on the vehicle. The interchangeable cutting mechanisms may also be mechanically installed, possibly done by attaching the cutting mechanism from driving over it with the vehicle and having the cutting mechanism automatically snap into place.

The cutting mechanism may comprise a single static blade that runs the entire width of the cutting mechanism. The cutting mechanism may also contain multiple blades that revolve around an axis to apply a spinning, slicing force to the weeds. Instead of containing a single blade, the cutting mechanism may contain a plurality of blades spaced apart in one rotating section of the mechanism and have another plurality of blades spaced apart in a different rotating section of the mechanism such that the second plurality of blades would apply the cutting force to the lateral physical space of weeds the first plurality of blades did not. Each blade may be removable by itself to allow for cleaning and sharpening. Also, each blade may also be removed as an entire row of blades or as an entire cutting mechanism.

Preferably, the cutting mechanism should be affixed to the vehicle such that the first part of the vehicle the weeds comes in contact with is the blade or blades of the cutting mechanism. This may occur by placing the cutting mechanism in the front of the vehicle. This also may occur by having a sufficiently high enough chassis that would be elevated above the weeds and crops. With a sufficiently high enough chassis, the cutting mechanism may be affixed below the main body of the vehicle making the cutting mechanism the only part of the vehicle that would come in contact with weed or crop canopies. If the cutting mechanism involves a rotating force with multiple levels of blades, the cutting mechanism should revolve at a high enough speed so as to cut substantially all of the weeds at the moment of impact closest to the ground based on the cutting mechanism height setting. One object of the invention is to have blades that are sufficiently sharp, moving at an appropriate speed to cut the weeds entirely across without causing them to break and fold leaving the upper part of the canopy to remain attached to the plant as it falls downward. Another object is to cut the canopies so that the stalk of the plant does not bend due to blunt lateral force caused by contact with the vehicle at a location other than the blades of the cutting mechanism. This will ensure the maximum amount of canopy is chopped, allowing more sunlight for crops below and reducing the number of times the canopy-gleaning process will need to occur during the growing season.

Located behind or underneath the cutting mechanism may be a collection devise. This collection devise may be used to prevent the cut plant material from falling to the ground. One object of the collection device is to prevent cut plant material from falling onto the delicate crop below the cut line. This collection may also be used for a variety of purposes: preventing reproductive seeds and plants from sowing into the soil for future growth, composting purposes, and if the canopy has a desired use or contains any crop the collection can be easily transported to a desired area for further use. The vehicle may also utilize a screen or other device near the cutting mechanism to collect pollen or other allergens. The farm equipment may also operate without a collection devise or basin. This embodiment may be used when the cutting mechanism is chopping weeds or plants that carry no risk of reproduction or crushing the crop below. This may be beneficial to allow the organic plant material to fall to the ground and start decomposing to provide nutrients to the soil.

BRIEF DESCRIPTION OF THE DRAWINGS

A better understanding of the inventive concept will be obtained by reference to the accompanying figures, wherein identical parts are identified by identical reference numerals and wherein.

DETAILED DESCRIPTION

Various embodiments of the invention will now be described in detail with reference to the accompanying drawing. These figures are merely provided to assist in the understanding of the invention and are not intended to limit the invention in any way. One skilled in the art will recognize that various modifications and changes may be made to any of these example embodiments without departing from the scope and spirit of the present invention. Any dimensions, lengths, or additional descriptive words located on drawings are merely included as an example or further description but are not intended to limit the invention in any way. This invention may apply to the cutting of any heightened crop or weed but for illustrative purposes, the following detailed descriptions are directed to cutting weeds above desired crops.

Figure 1:
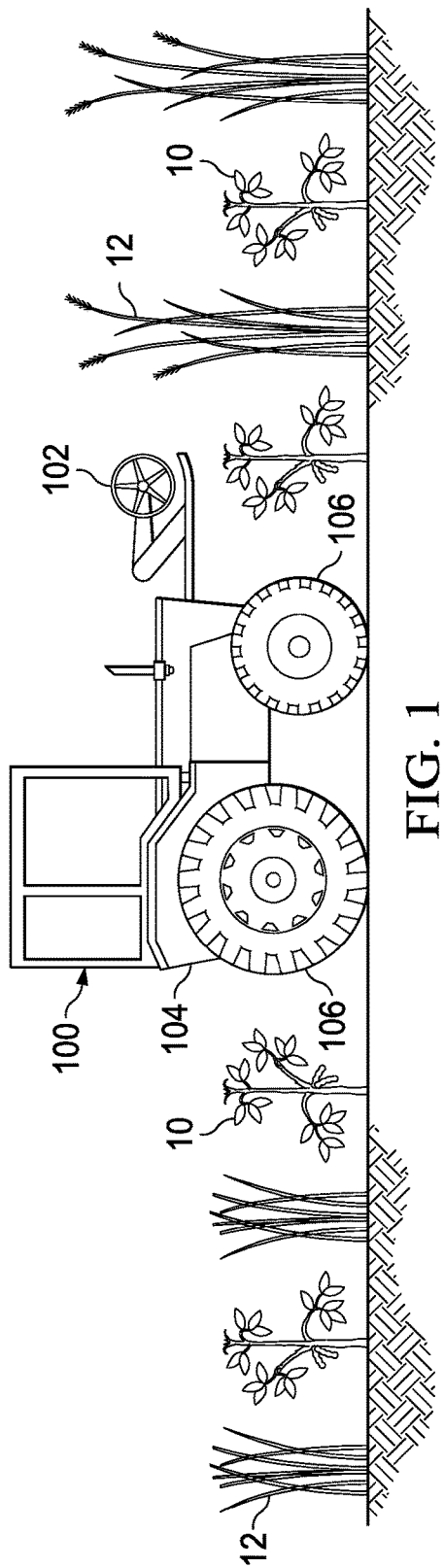
FIG. 1 is a schematic depiction of a first embodiment of the inventive concept.

Referring to FIG. 1, a crop 10 is overgrown with invasive weeds 12. The crop 10 may be soybeans or any other desirable plant, but particularly a crop plant that las a low canopy, that is, it grows close to the ground. The weeds 12 may be giant ragweed or any other undesirable plant. Particularly in an "organic" agricultural scenario, the inability to use chemical agents against the giant ragweed presents an exacerbating factor. These weeds 12 are blocking sunlight from reaching the crop 10 and hampering growth, due to their growth above the crop canopy. To remedy this situation, the first embodiment 100 of a crop canopy gleaner vehicle is provided. A cutting mechanism 102 of the vehicle 100 is adjusted to an appropriate height, allowing a chassis 104 of the vehicle and the cutting mechanism to pass above the canopy level of the crop 10. The vehicle 100 has a sufficiently wide base such that the wheels 106 of the vehicle 100 traverse in between rows of the crop 10. As the vehicle 100 advances (from left to right in FIG. 1), the cutting mechanism 102 chops the invasive weeds 12 at the height set by the user and leaves undisturbed crops 10 in the vehicle's wake. Sunlight may now reach the undisturbed crops 10 and countless time and money are saved in the process. In this embodiment 100, the chassis 104 is preferably built sufficiently high enough above the ground that no adjustment of chassis height is required. In this embodiment 100, the chassis 104 is effectively a conventional farm vehicle with an internal combustion engine that drives the wheels 106 and, by means of a hydraulic system, operates the cutting mechanism 102.

Beyond the targeted applicability to removing giant ragweed growing above the cop canopy of soybeans. It is notable that the present invention finds its preferred use in clipping the reproductive part of a developing weed that is found growing in between rows and between seeds of row crops only because typically there is not a significant number of weeds growing in cover crops.

Unlike articulated combines used to harvest wheat, oats, rye, barley, corn, sorghum, soybeans, flax/linseed, sunflowers, and canola, the crop canopy gleaner is intended only for use in soybean and field corn crops, both of which are row crops. Like their name, row crops are seeded in parallel lines across a field, leaving spaces between seeded lines where no crop is planted. These spaces between seeded rows range from 6-36 inches depending on the production preferences and planter settings made by the grower.

The crop canopy gleaner is designed so that the wheels 106 run between the rows, and not on top of the crop. In contrast, the wheels of an articulated combine are positioned to be driven on top of harvested crop stubble, after removal of the plant. In this way, an articulated combine is not appropriate for use with a crop that is still growing. The crop canopy gleaner is not appropriate for cover crops (wheat, oats, rye, barley, flax, canola) because these crops do not have row gaps where the tires of the crop canopy gleaner would be placed to avoid damaging/smashing the growing crop.

Figure 2:
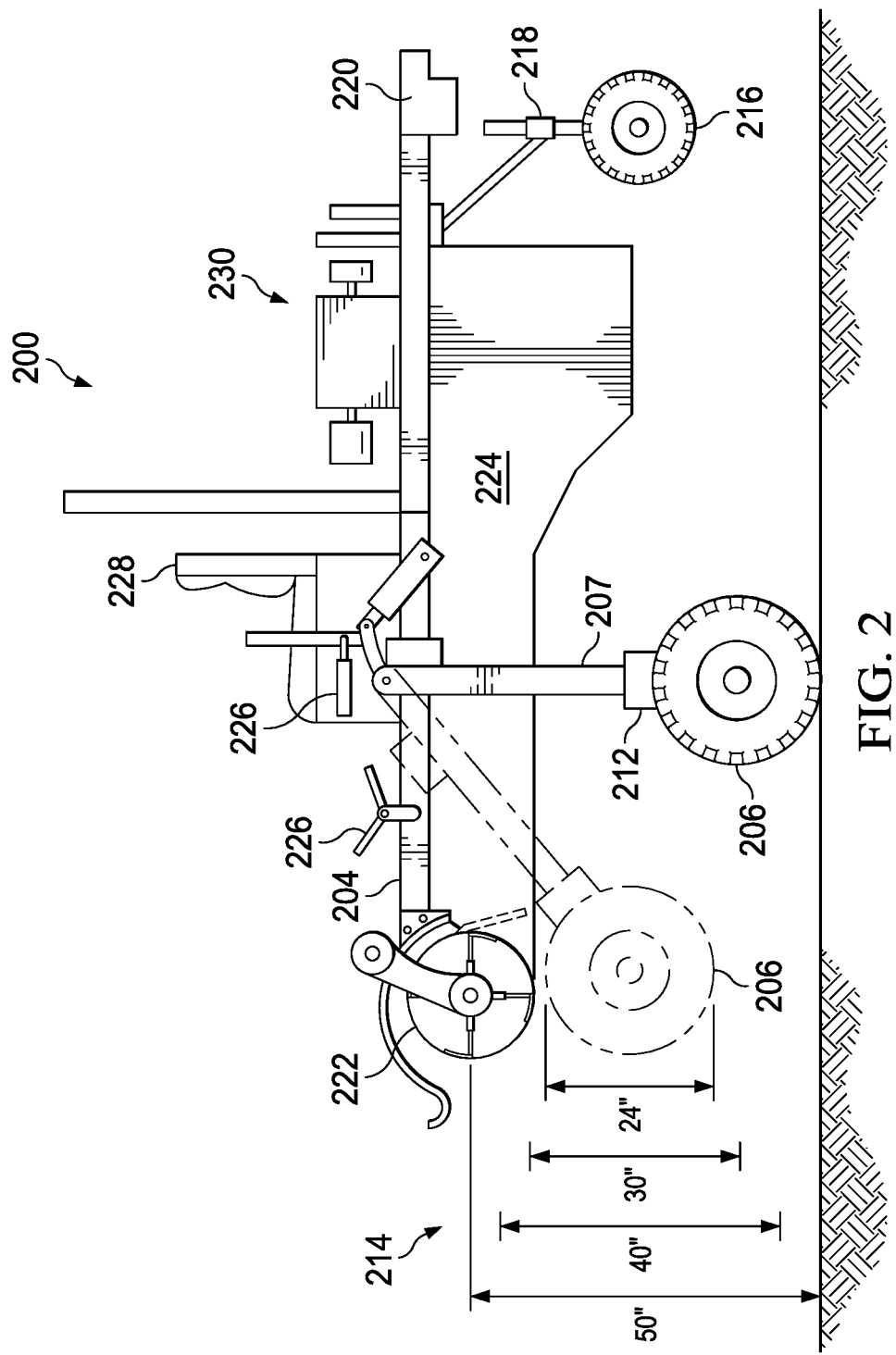
FIG. 2 is a side elevation view of a second embodiment of the inventive concept.
Figure 3:
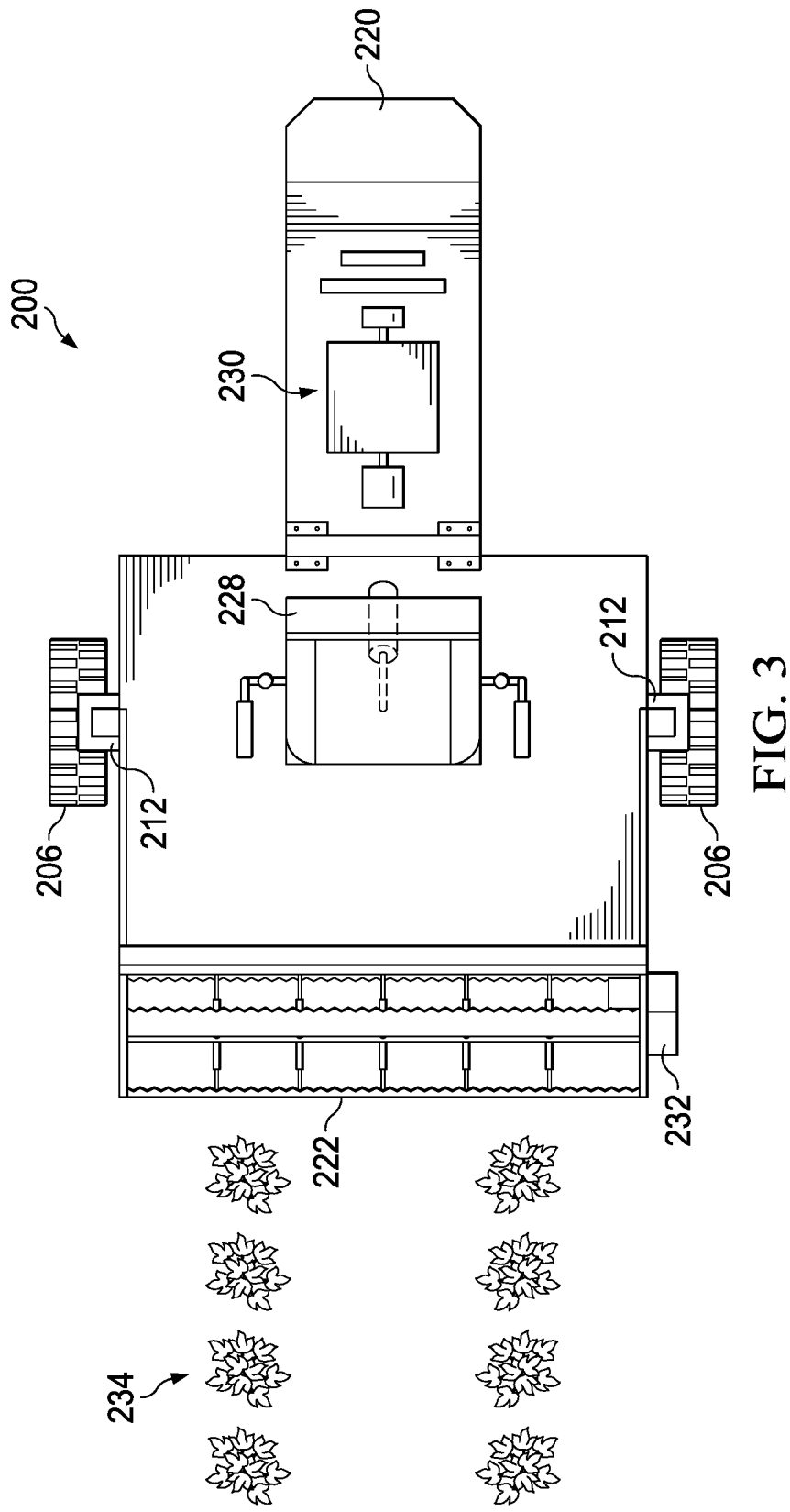
FIG. 3 is a top plan view of the FIG. 2 embodiment.

Referring to FIGS. 2 and 3, side and top perspective views of another embodiment 200 are depicted. In this embodiment 200, the vehicle has a pair of front wheels 206, each of which is powered by a hydraulic motor 212. Because of the hydraulic motors 212, no axle connects the wheels and each wheel is driven independently. This allows the height of the vehicle 200 to be adjusted to raise the bottom of chassis 204 above the crop height, so various height adjustments 214 are shown. It also allows guidance of the vehicle 200 by differential power to the wheels receiving drive power. In this embodiment, the cutting mechanism 222 is fixed statically to the chassis, and the proper height is determined by a lowering and raising of wheels 206. Each front wheel 206 may be arranged so the side-view of the strut 207 to which the wheel is attached is perpendicular with the ground, allowing the highest cutting setting. Angular movement of the strut 207 allows the front wheel 206 to be positioned at various angles to reduce the overall height of the vehicle 200 and allow for different cutting heights 214. The single back wheel 216 may also be attached to a hydraulic mount 218 such that both front and back wheels 206, 216 can be adjusted in tandem to keep the chassis 204 of the vehicle substantially parallel with the ground. In certain embodiments, a weight 220 may be added to the back of the chassis 204 to counterbalance the weight of the cutting mechanism 222 located at the front of the chassis. Although a hydraulic mount is depicted to change the height of the cutting mechanism 222, any other means for raising and lowering the vehicle may be employed. Instead of having the wheels move from the hydraulic mount to change the cutting height, the cutting mechanism 222 may be connected to the hydraulic mount or other means of raising and lowering the cutting mechanism while the wheel positions remain constant on the vehicle.

In preferred models of the inventive concept, there are 3 wheels, with a pair of front wheels and a single trailing wheel. In such a case, the canopy gleaning device will pass over an adjacent pair of crop rows, with the front wheels running along an unseeded space outside the pair of rows and the third wheel running along an unseeded space between the adjacent pair of crop rows. When there are four wheels used, the front wheels and rear wheels are set out in a rectangular profile, with the rear wheels following along the same unseeded space, regardless of whether one or two crop rows are being operated upon at a time.

In this embodiment, the cutting mechanism 222 may apply an upward rotational cutting force to the weeds. This upward, rotational force may carry the weeds above the cutting mechanism in a scooping manner to allow the weeds to fall into a collection basin or bag 224 located behind it and underneath the chassis. All operational controls 226 are positioned at an easily accessible location relative to the operator's seat 228. These may readily be replaced with electronic processors to allow autonomous operation, which may be important as it significantly can reduce the overall weight borne by the device. Located behind the operator's seat 228 may be any necessary components 230 essential to providing operative power, including but not limited to or limited by, an engine, radiator, and oil cooler.

While a collection basin or bag 224 is shown, such a feature is not required and may actually be undesirable in some circumstances. When provided, the collection basin 224 allows the weeds chopped from above the canopy of the desired crop to be removed from the field, but the cost of doing this is to add weight and energy expenditure to the crop gleaner device, both of which affect the necessary width of the wheels, which should be kept as small as possible. This lack of a need for a collection basin 224 distinguishes the device from an articulating combine and the corn stalk harvester. Further, extra weight of the collected weed plant matter (wet when the machine is in use) would push the device into the ground too far for the hydraulics to overcome the friction with the ground and keep the device moving with controlled direction, at a steady pace across the field. The small width of the wheels is what keeps the device nimble and able to navigate between the crop rows, not smashing the developing soybean plants. The small wheels also dig into the soil as more weight is added to the device, creating unfavorable ruts in the field. The device has already become stuck in soft soil which is why it is being repaired to add more pressure per square inch to the front wheel hydraulics.

A shield 232 may be located near the cutting mechanism to prevent errant displacement of cut material. The vehicle will also have a sufficiently wide base such that the entire crop row 234 may pass underneath it unscathed. In this embodiment the single back wheel 216 may pass over crops but damage will be minimized due to the narrow size of the wheel.

Figure 4:
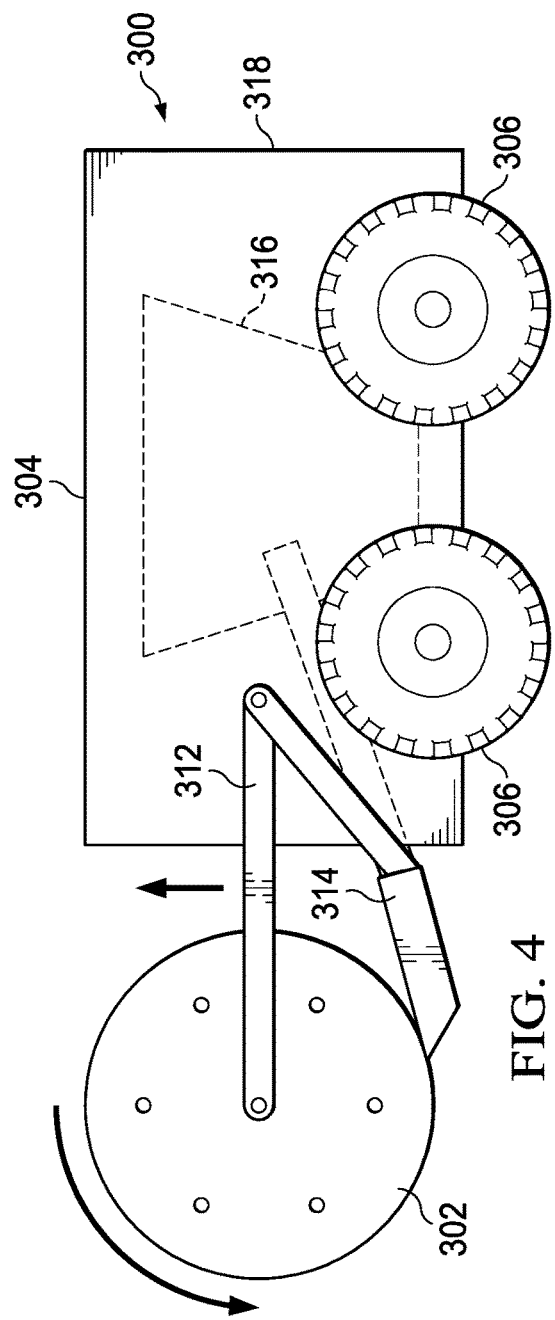
FIG. 4 is a side elevation view of a third embodiment of the inventive concept.

Referring to FIG. 4, another embodiment 300 of the invention is depicted. In this embodiment, the cutting mechanism 302, which is located at the front end of the intended direction of travel, may rotate to provide a downward cutting force to the weeds. Cutting mechanism 302 is attached to the chassis 304, which has wheels 306. The lifting mechanism 312 may also be in connection with the cutting mechanism 302 to adjust the height at which the weeds are cut. Beneath the cutting mechanism 302 is a collection device 314 where the weeds will land after being cut. The collection device 314 may then move the weeds to a storage basin or tote 316 by conveyor, suction, fans, or any other weed-movement means. This embodiment may also contain a location in the back 318 of the vehicle to empty the storage basin or tote 316. Internal to the chassis 304 is a means for driving the wheels, preferably a means for providing hydraulic power to the wheels 306 and the cutting mechanism 302. The power could be provided by a battery-powered electric motor or an internal combustion engine. Notably, there is no provision for a driver compartment in embodiment 300. This embodiment 300 is anticipated to be an autonomous vehicle, with drive power being applied individually to at least the two rear wheels, although some versions could have drive power applied to all four wheels. Although no crops are shown in FIG. 4 to allow comparison, the base of the chassis 304 will be sufficiently high for it to clear the canopy of the crop. Adjustability of the base height of the chassis 304, while desirable, is not required and, in some embodiments, the base height may be fixed.

Figure 5:
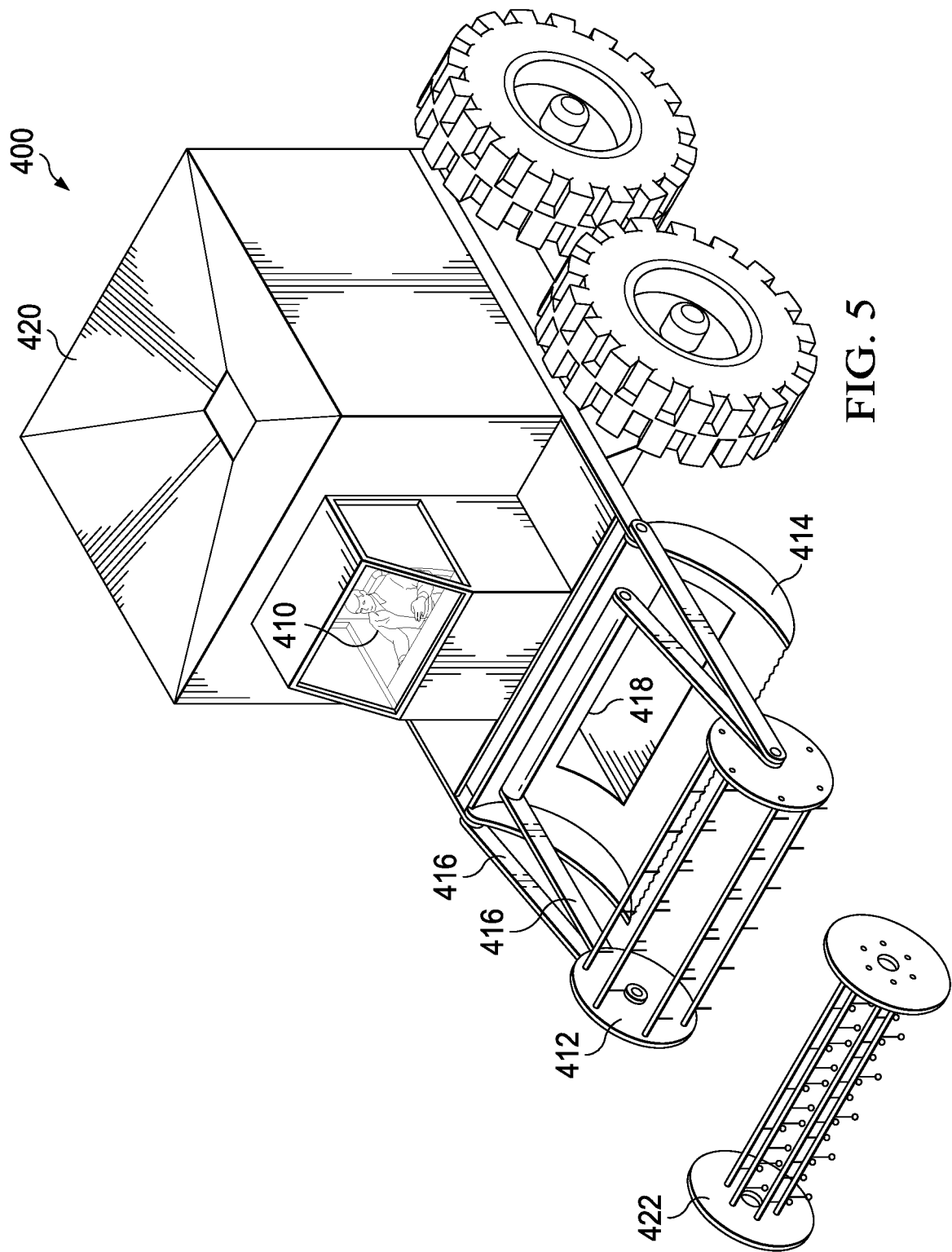
FIG. 5 is a top front perspective view of a fourth embodiment of the inventive concept.

Referring to FIG. 5, a perspective view of another embodiment 400 is depicted. This embodiment 400 may be operated by a user in a driver compartment 410 with all controls conveniently located within arm's length. The invention may also utilize a separate mechanism 412 to guide the canopy to the cutting mechanism 414. This gleaning mechanism 412 and cutting mechanism 414 may be raised and lowered through connected bars 416 and an appropriate height adjusting mechanism, either in tandem or separately. This height adjustment may be used to accurately glean the top of the crop canopy leaving the crop below unscathed. The gleaning mechanism 412 may consist of rotating blunt blades to guide the canopy towards the cutting mechanism 414. This cutting mechanism 414 may employ its own rotating sharpened blades to cut the plant material after being guided by the gleaning mechanism. This cutting mechanism 414 may also contain serrated teeth moving side to side to effectuate a cut of the canopy. The gleaning mechanism 412 may also be used to properly position the plant material above the cutting mechanism 414. In doing so, the plant material will fall on top of the cutting mechanism 414, past the blades where a plant movement mechanism 418 will guide the cut plant material to the collection basin 420. The plant movement mechanism 418 may include a revolving conveyor, fans, suction, or any other means to move the plant material to the collection basin 420. Both the gleaning mechanism 412 and the cutting mechanism 414 may be removed. This embodiment depicts an alternative flail mower 422 mechanism that may be attached in the same manner as the gleaning or cutting mechanism. This flail mower 422 may be advantage to chop up cut plant material into smaller pieces allowing for quicker decomposition, resulting in more nutrients provided to the soil quicker. When the flail mower 422 is attached, the plant movement mechanism 418 may be disabled by the user if the purpose is to naturally allow the chopped canopy to become organic fertilizer. As the flail mower 422 may be adjusted by the connected bars 416, the flail mower 422 may be advantageous to grind all remaining plant matter to begin decomposing faster. The height may be set to ground level and the entire field can efficiently be chopped providing better soil structure and nutrients for next year's crops.

The crop canopy gleaner is intended for use exclusively during the reproductive stages of giant ragweed which occurs before the reproductive development of soybeans (and field corn). While cultivation and other manual methods of weed removal early in the soybean/corn development cycle eliminate some of the weed population in a field, cultivation practices cannot remove the giant ragweed that has seeded within the crop row. Additionally, giant ragweed is highly adaptive and virulent and has been shown to grow new shoots at points of injury to the weed (such as damage during cultivation or manual weed trimming), growing wide, broad leaves 4-8 inches in length. The presence of such large leaves quickly gives the giant ragweed a photosynthetic advantage over the young soybean/corn crop. The giant ragweed proceeds to form a canopy over the grain crop and stunts the development of the early in its growth cycle by choking out available sunlight.

The timing for device use is unique to other devices. Unlike the articulated combine or the weed cutting attachment for a combine which are used at the time of crop harvest (wheat, oats, corn, soybeans), the crop canopy gleaner is used during the early growth stage of the row crop, at flowering and prior to fruiting. The timing for the device use is based on the developmental stage of the target invasive weed, giant ragweed, instead of the developmental stage of the grain crop (soybeans or field corn). The device is intended for use on soybeans that have yet to flower, flowered, or flowered but yet to fruit (produce viable soybean pods). This timeline occurs before the soybean canopy has reached 4 feet from the ground, and while the giant ragweed is in its reproductive stage. The device, if used in fields of field corn, is designed for use before the tallest leaves of the corn plant have reached 4 feet. This is long before (1-1.5 months) a field corn plant would tassel or develop ears of corn, when it would qualify for use by the corn stalk harvester The timing of use of the crop canopy gleaner is such that the flail mower contacts the giant ragweed plants after the male reproductive portions (stamen) of the weed have formed, but prior to the production of viable of pollen. Pollen production in the giant ragweed is signaled by the formation and distribution of bright orange and yellow pollen granules, visible to humans, and most commonly the cause of ragweed allergies. By applying the flail mower to the giant ragweed at this critical point of influence in the giant ragweed life cycle, most of the resources in the weed have been dedicated to reproduction and the creation of reproductive parts, not to leaf development for photosynthesis. Attacking the weeds at this phase, by removing the stamen and broad leaves that rest above the canopy of the soybean crop, serves to castrate the weed while simultaneously destroying its viable, photosynthetic leaves which would support its regrowth. Once the broad leaves of the giant ragweed are removed, they can no longer compete with the soybean crop for sunlight, and the weed's viability is significantly compromised. Following the use of the device, the soybean crop below has increased access to sunlight, and can grow upwards to a point above the cut giant ragweed, reclaiming its position as the dominant crop in the field.

Comparatively, the corn stalk harvester is used later in the lifecycle of the corn plant, in both field corn and sweet corn. Later points in the corn production cycle when the corn stalk harvester may be used include times of corn tasseling, corn fruiting (when ears are evident), at pollen production, and at drying/harvest. or later, is designed to extend above the canopy of mature corn stalks, both field corn and sweet corn varieties, which can range from 7-14 feet above the ground. The corn stalk harvester also has a collection receptacle to collect pollen and other sections of the corn stalk, whereas the crop canopy gleaner is designed not to collect plant material (reproductive or otherwise), but to shred it so it is no longer viable.

Giant ragweed germinates in North America between March-June, and can grow between 5-16 feet tall within row crops at full maturity, between August-September when developed and pollinated seed pods can be viewed on the giant ragweed plant. The crop canopy gleaner is intended for use between June-July, the critical period of influence, immediately prior to reproduction of the giant ragweed.

Related to the timing, but more of a consequence, is the importance of removing of ragweed seed pods from the soybean (or field corn) crop prior to harvest. Aside from the compromised crop yields because of the giant ragweed's competition for sunlight and soil nutrients, another way giant ragweed decimates crop yields is the production of weed seeds. Once giant ragweed has successfully pollinated and viable seed pods have developed, the fate of next year's crop has been sealed. If left standing, the pollinated seeds from the giant ragweed fall to the ground following a frost event or during harvest activities and lay dormant until the following spring when they germinate. An intervention to remove viable weed seeds at harvest is the use of a combine. A combine has screens prior to the grain collection bin, enabling it with the capacity to sort seeds and grain based on weight and size. The problem with giant ragweed seed is that when mature, it is of similar circumference and weight as a soybean hull or corn kernel and indistinguishable to the combine screen, is not removed in the screening process. Also, a percentage of the giant ragweed seeds are not caught by the screens and exit the combine in their viable form with the chaff, effectively seeding next year's weed problem.

The consequence is more labor and expense following harvest to manually screen the giant ragweed seeds out of the harvested grain, typically with a color sorter or a seed cleaner, both of which have a higher level of acuity in distinguishing seed size. Either way, the value of the harvested crop is compromised because of the additional labor needed. If the harvested grain crop is left unfiltered with giant ragweed seeds mingled within soybeans or corn, the giant ragweed seeds have a high moisture content that can cause rot in grain storage bins. Additionally, if sold with the giant ragweed seed mingled with soybeans or corn, the rate of pay is substantially lower because of the lack of homogeneity in the harvest.

Any embodiment of the present invention may include any of the optional or exemplary features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A farm implement for removing weed growth above a canopy of a crop grown in separated rows, the implement comprising:
    a chassis;
    at least three wheels connected to the chassis;
    a cutting mechanism, mounted at a front end of the chassis, the cutting mechanism configured to cut and grind weed growth above the canopy of crop grown in separated rows to substantially prevent contacted weeds from reproducing;
    means for transporting the weed growth cut and ground by the cutting mechanism to the canopy of crop grown in separated rows positioned directly below the implement immediately after the weed growth is cut and ground by the cutting mechanism, mounted on the chassis;
    means for generating and selectively applying rotational torque to at least one of the at least three wheels; and
    means for a user to guide the chassis down the crop rows.

2. The implement of claim 1, wherein:
    there are four wheels attached to the chassis, consisting of a pair of front wheels near the front end of the chassis and a pair of rear wheels near a rear end of the chassis.

3. The implement of claim 1, wherein:
    two of the at least three wheels are attached to the chassis near the front end thereof, to support the cutting mechanism in a balanced manner.

4. The implement of claim 1, further comprising:
    means for adjusting the height of a base of the chassis.

5. The implement of claim 4, wherein:
    the means for adjusting the height of the chassis base operates by adjusting the height of the at least three wheels.

6. The implement of claim 5, wherein:
    the means for adjusting the height of the chassis base comprises, associated with each of the at least three wheels, a strut that connects the associated wheel to the chassis in an adjustable manner, wherein the strut is configured to be positioned at various angles corresponding to various heights of the chassis.

7. The implement of claim 2, wherein:
    the means for generating and selectively applying rotational torque to at least one of the at least three wheels comprises hydraulic motors associated with each of the rear wheels.

8. The implement of claim 7, wherein:
    the means for a user to guide the chassis down the crop rows applies the rotational torque in a differential manner to the rear wheels.

9. The implement of claim 1, wherein:
    the means for generating and selectively applying rotational torque further applies rotational torque to the cutting mechanism.

10. The implement of claim 1, wherein:
    the means for generating and selectively applying rotational torque further comprises an internal combustion engine.

11. The implement of claim 8, wherein:
    the means for generating and selectively applying rotational torque further comprises an internal combustion engine.

12. The implement of claim 9, wherein:
    the means for generating and selectively applying rotational torque further comprises an internal combustion engine.

13. A method of protecting a crop from at least one weed species growing above a canopy level of the crop, comprising the steps of:
    planting the crop in spaced-apart rows; and
    at least once during a growing season of the crop, passing a farm implement according to claim 1 along the rows of the crop, using the farm implement to cut off weed growth above the canopy level of the crop.

14. The method of claim 13, wherein:
    the farm implement straddles the crop, with the chassis thereof passing over the canopy level and the at least three wheels thereof travelling along a space between a pair or adjacent rows.

15. The method of claim 13, wherein:
    the step of passing the farm implement along the rows of the crop occurs during a reproductive stage of the at least one weed species, resulting in grinding of reproductive portions thereof.

16. The method of claim 13, wherein:
    the crop is soybeans; and
    the at least one weed species comprises giant ragweed.

17. The implement of claim 1, further comprising:
    a shield, configured to prevent errant displacement of cut and ground weed growth.

18. The implement of claim 1, further comprising:
    a gleaning mechanism, comprising a plurality of blunt blades configured to rotate to guide weed growth towards the cutting mechanism.

* * * * *